United States Patent
Voss et al.

(10) Patent No.: US 7,248,301 B2
(45) Date of Patent: Jul. 24, 2007

(54) SYSTEM AND METHOD FOR PROVIDING CAMERA FOCUS FEEDBACK

(75) Inventors: James S. Voss, Fort Collins, CO (US); Jim Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.

(21) Appl. No.: 10/428,243

(22) Filed: May 2, 2003

(65) Prior Publication Data

US 2004/0218086 A1  Nov. 4, 2004

(51) Int. Cl.
*H04N 5/232* (2006.01)
*H04N 5/222* (2006.01)

(52) U.S. Cl. .................... 348/346; 348/333.04

(58) Field of Classification Search .......... 348/333.02, 348/333.04, 333.11, 333.12, 345, 346, 349
See application file for complete search history.

(56) References Cited

U.S. PATENT DOCUMENTS

| | | | | |
|---|---|---|---|---|
| 5,496,106 A | * | 3/1996 | Anderson | 348/255 |
| 6,137,534 A | * | 10/2000 | Anderson | 348/222.1 |
| 6,359,650 B1 | * | 3/2002 | Murakami | 348/333.04 |
| 6,504,575 B1 | | 1/2003 | Ramirez et al. | |
| 6,526,234 B1 | | 2/2003 | Desormeaux | |
| 6,812,969 B2 | * | 11/2004 | Ide et al. | 348/346 |
| 6,888,567 B2 | * | 5/2005 | Watanabe | 348/211.8 |
| 6,937,284 B1 | * | 8/2005 | Singh et al. | 348/346 |
| 2003/0002870 A1 | * | 1/2003 | Baron | 396/147 |
| 2003/0117511 A1 | * | 6/2003 | Belz et al. | 348/333.11 |

FOREIGN PATENT DOCUMENTS

| JP | 03-011884 A | 1/1991 |
|---|---|---|
| JP | 2000-125178 A | 4/2000 |
| JP | 2001-159730 A | 6/2001 |
| JP | 2002-006206 A | 1/2002 |

* cited by examiner

*Primary Examiner*—Vivek Srivastava
*Assistant Examiner*—Timothy J Henn

(57) ABSTRACT

Disclosed are systems and method for providing feedback to a user. In one embodiment, a system and a method pertain to analyzing levels of focus of discrete portions of an image, evaluating a relative focus of the image portions, and identifying to a user the image portions having the highest level of focus.

17 Claims, 8 Drawing Sheets

SYSTEM AND METHOD FOR PROVIDING CAMERA FOCUS FEEDBACK

BACKGROUND

Most cameras, including digital cameras, comprise an autofocus feature with which objects in a viewed scene can be automatically focused by the camera. The autofocus functionality can either be continuous, wherein the camera continually adjusts the camera focus as the viewed scene changes, or single, wherein autofocusing only occurs when a user depresses (e.g., halfway depresses) a shutter button.

Irrespective of the autofocus mode that is used, focusing is typically achieved by analyzing the viewed scene with a focusing algorithm. In particular, discrete portions of the viewed scene are analyzed independently and values are assigned to each as to the degree of focus that is observed. These portions may comprise portions of the entire scene, or only a part of it (e.g., the center of the scene). The values are assigned to the various analyzed portions by evaluating the perceived sharpness of objects in each portion. After the analysis has been conducted and values assigned, the lens system is manipulated to alter the focus, and the analysis is conducted again to generate new values for the various portions. The new values for the portions are then compared to those previously assigned to the respective portions to determine whether the focus improved or got worse. This process continues until the optimum focus has been determined.

The autofocus method described above works well in most conditions. Sometimes, however, unintended results can occur. For example, in situations in which the subject (e.g., a person) is in the foreground of a viewed scene, but higher contrast objects are in the background, the camera may, contrary to the user's intent, focus on the background instead of the subject. To cite another example, if the subject is to the side within a viewed scene, the background (which occupies the center of the framed scene) may be used as the object of interest by the autofocus system. Therefore, if the user's friend stands before a mountain range but is not in the center of the composed shot, it is likely that the mountain range, and not the friend, will be in focus.

Although such problems can typically be avoided by first focusing only on the subject, locking the focus (e.g., by pressing the shutter button halfway), and then composing the picture before capturing an image, most casual camera users are not that savvy. Therefore, many users capture images in which objects are out-of-focus.

One benefit of digital cameras is that they allow the user to immediately view a captured shot. Despite this capability, the user is not likely to detect an out-of-focus condition in that the displays of most cameras are too small, and their resolutions are too low, for the user to readily identify this condition. The situation is even worse when the display is used to compose the shot. In that live view images shown in the display while a picture is being composed are typically very low resolution images (to enable images to be shown real time), it is very difficult for the user to tell whether the subject is or is not in focus.

SUMMARY

Disclosed are systems and method for providing feedback to a user. In one embodiment, a system and a method pertain to analyzing levels of focus of discrete portions of an image, evaluating a relative focus of the image portions, and identifying to a user the image portions having the highest level of focus.

DETAILED DESCRIPTION

As identified in the foregoing, camera users often do not realize that an object in an image they have captured or are about to capture is out of focus. In such situations, the user is likely to miss a desired shot. This is true even when, as with most digital cameras, the camera includes a display that shows the composed and/or captured image in that such displays are typically too small in size and/or their resolution is too low to provide such feedback.

As is described below, however, feedback as to the focus of a composed or captured image can be provided to the user by evaluating discrete portions of the focused or captured image and then displaying indicia on the display that conveys to the user which aspects of the image are most in focus. With such feedback, the user can determine whether the intended subject is or is not in focus and, depending upon when the feedback is provided, either recompose or recapture the image until the desired result is achieved.

Figure 1:
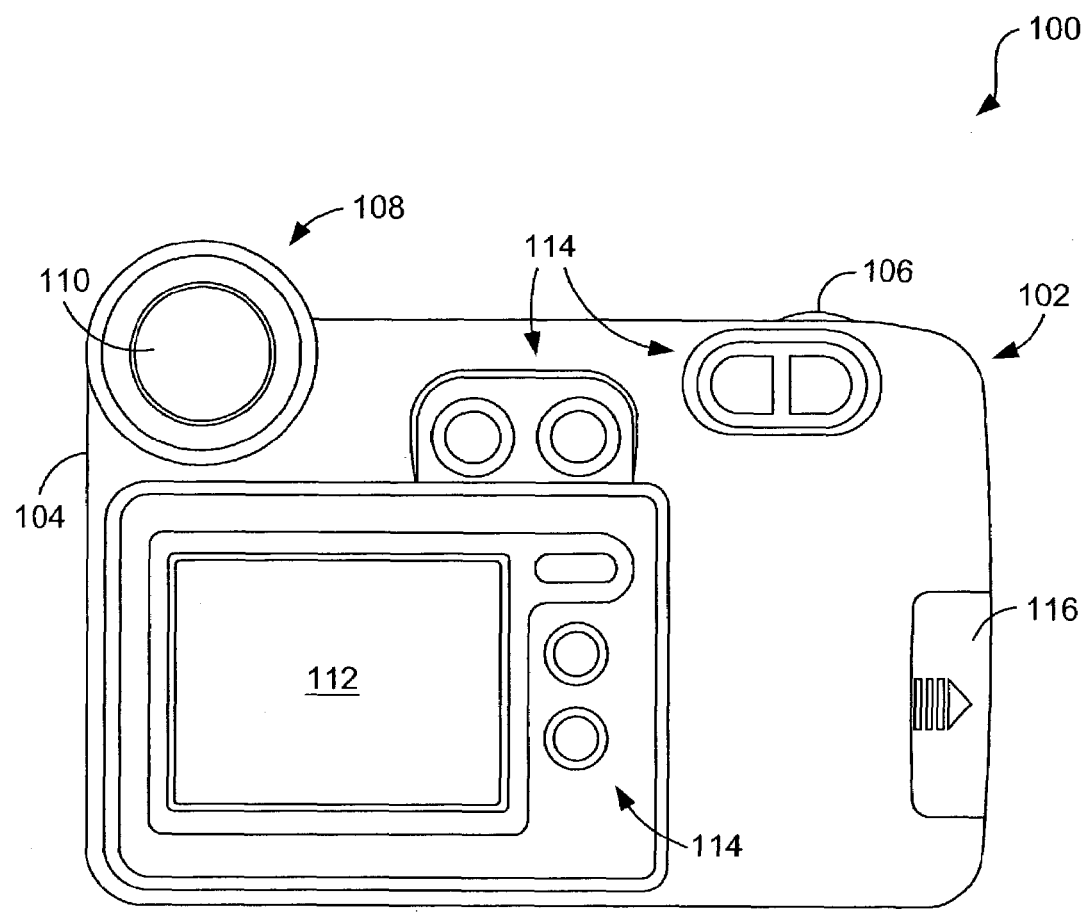
FIG. 1 is a rear perspective view of an embodiment of an example camera that provides focus feedback.

Described below are systems and methods which provide focus feedback to the user. Although particular embodiments are identified in an effort to fully describe the disclosed systems and methods, these embodiments are provided for purposes of example only. Referring now to the drawings, in which like numerals indicate corresponding parts throughout the several views, FIG. 1 illustrates an embodiment of a camera 100 that provides focus feedback to users. In the example of FIG. 1, the camera 100 is a digital still camera. Although a digital camera implementation is shown in the figures and described herein, the camera can, alternatively, comprise any camera that provides visual feedback relative to a composed or captured image.

As indicated in FIG. 1, the camera 100 includes a body 102 that is defined by an outer housing 104. The top portion of the camera 100 comprises a shutter button 106 that is used to open the camera shutter (not visible in FIG. 1). Formed with the camera body 102 is a viewfinder 108, such as an electronic viewfinder (EVF), which includes a view window 110. The back panel of the camera 100 may include a flat panel display 112 that, for example, comprises a liquid crystal display (LCD) or light emitting diode (LED) display.

Various control buttons 114 are also provided on the back panel of the camera 100. These buttons 114 can be used to, for instance, scroll through captured images shown in the display 112, make selections from camera menus, etc. Also shown in FIG. 1 is a compartment 116 that is used to house a battery and/or a memory card.

Figure 2:
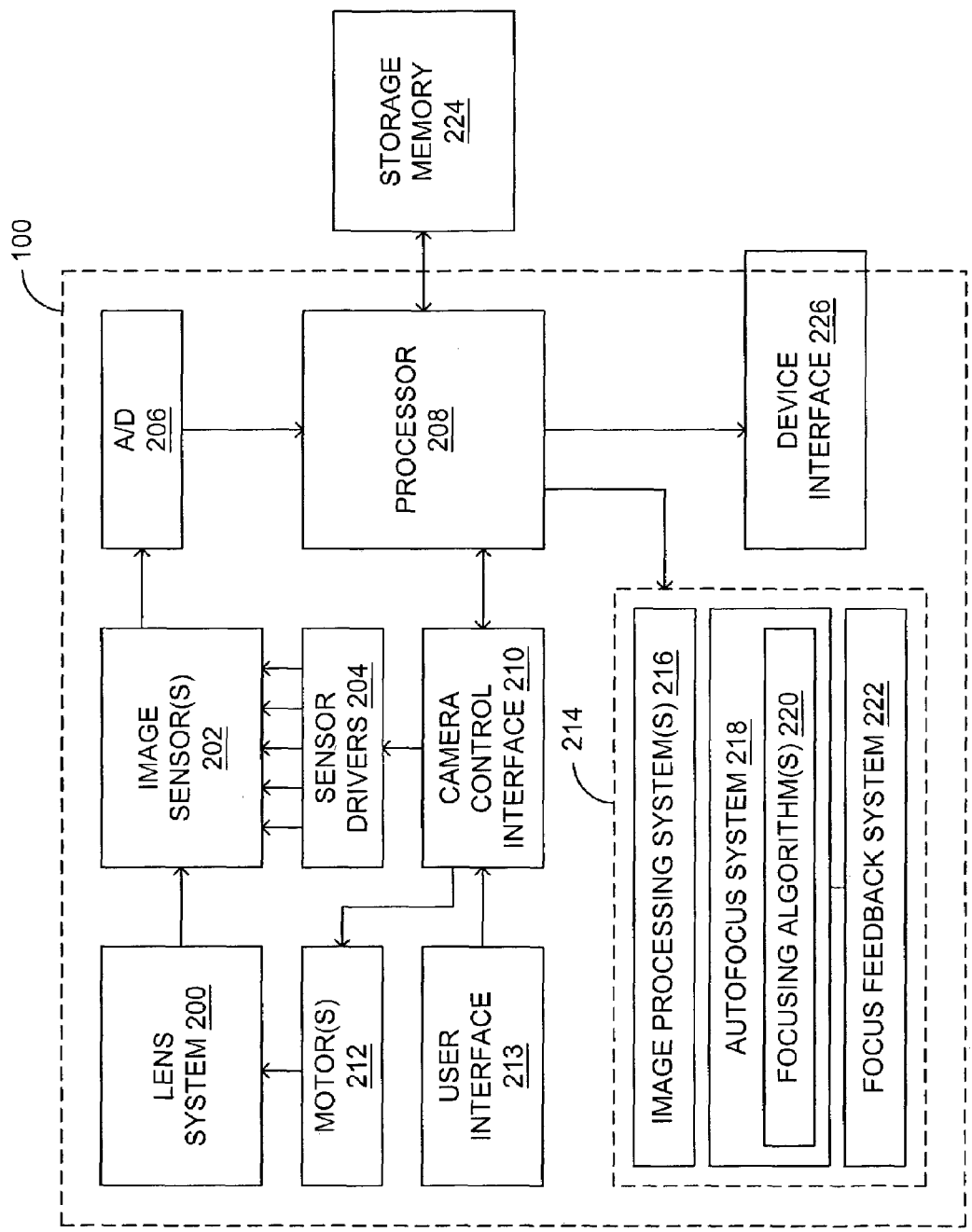
FIG. 2 is an embodiment of an architecture of the camera shown in FIG. 1.

FIG. 2 illustrates an example architecture for the camera 100. As indicated in this figure, the camera 100 includes a lens system 200 that conveys images of viewed scenes to one or more image sensors 202. By way of example, the image sensors 202 comprise charge-coupled devices (CCDs) that are driven by one or more sensor drivers 204. The analog image signals captured by the sensors 202 are then provided to an analog-to-digital (A/D) converter 206 for conversion into binary code that can be processed by a processor 208.

Operation of the sensor drivers 204 is controlled through a camera controller 210 that is in bi-directional communication with the processor 208. Also controlled through the controller 210 are one or more motors 212 that are used to drive the lens system 200 (e.g., to adjust focus and zoom). Operation of the camera controller 210 may be adjusted through manipulation of the user interface 213. The user interface 213 comprises the various components used to enter selections and commands into the camera 100 and therefore at least includes the shutter button 106 and the control buttons 114 identified in FIG. 1.

The digital image signals are processed in accordance with instructions from the camera controller 210 and the image processing system(s) 216 stored in permanent (non-volatile) device memory 214. Processed images may then be stored in storage memory 224, such as that contained within a removable solid-state memory card (e.g., Flash memory card). In addition to the image processing system(s) 216, the device memory 214 further comprises an autofocus system 218 that includes at least one focusing algorithm 220. Furthermore, the device memory 214 includes a focus feedback system 222 that, as is described in greater detail below, is used to provide feedback to the user in a camera display (either a viewfinder display or rear panel display) as to focus attributes of a composed or captured image. Although the autofocus system 218 and the focus feedback system 222 are illustrated as separate modules, the two systems may be combined and/or components of one system may be integrated into or shared with the other system. For example, a focusing algorithm 220 of the autofocus system 218 may be incorporated into the focus feedback system 222, if desired.

The camera embodiment shown in FIG. 2 further includes a device interface 226, such as a universal serial bus (USB) connector, that is used to download images from the camera to another device such as a personal computer (PC) or a printer, and which likewise can be used to upload images or other information.

Figure 3:
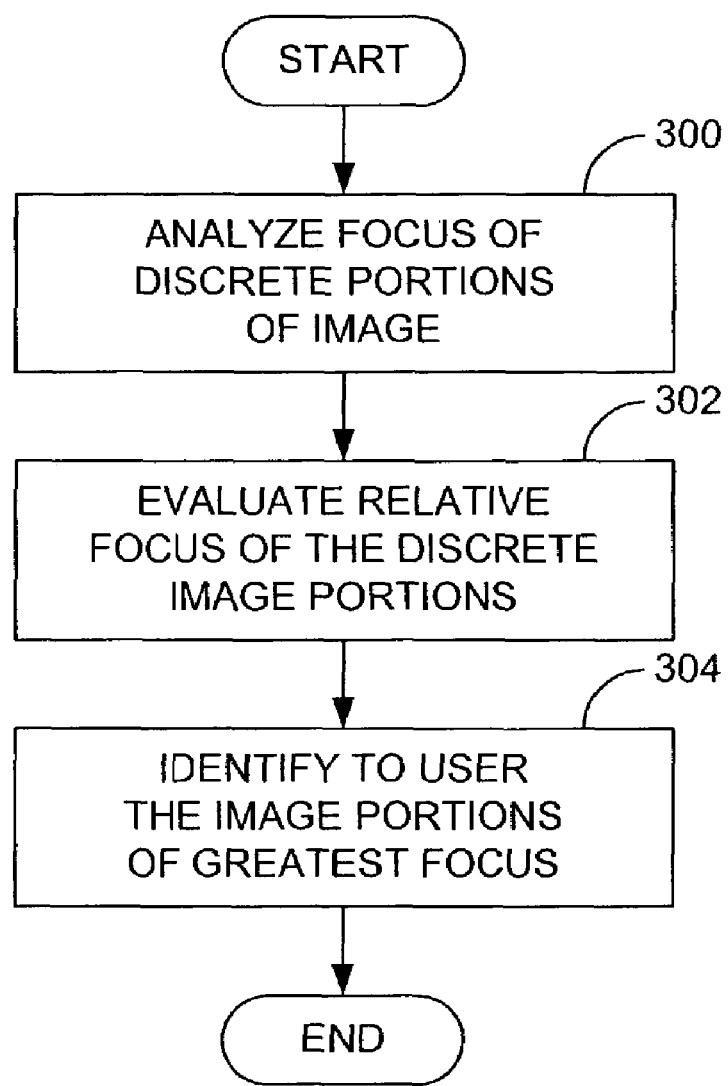
FIG. 3 is a flow diagram of a first embodiment of a method for providing focus feedback.

FIG. 3 is a flow diagram of a first embodiment of a method for providing focus feedback to a camera user. Any process steps or blocks described in this or other flow diagram of this disclosure may represent modules, segments, or portions of program code that includes one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 300 of FIG. 3, the focus feedback system 222 analyzes the focus of discrete portions of an image. This image can comprise a composed image of a viewed scene (i.e., a focused image) prior to capturing or a captured image. Regardless, the discrete portions of the image are analyzed to determine the level of focus that is obtained. This determination may be made, for instance, by applying the focus algorithm 220 that was used to focus the viewed scene during an autofocusing procedure of the camera 100. Alternatively, the determination may be made by applying the focus algorithm 220 to an image that was manually focused by the user. In either case, the focus feedback system 222 evaluates the relative focus of the discrete portions of the image, as indicated in block 302. In particular, the system 222 determines the level of focus of each discrete portion to identify which portions are most in focus.

Once the relative focus of the discrete portions has been evaluated, the system 222 identifies the portions of the image having the greatest focus to the user, as indicated in block 304. By way of example, the system 222 generates graphical indicia to be displayed in the camera display that identifies the portions of the image having the greatest focus. After these high focus portions of the image have been identified, flow for this session of the system 222 is terminated.

Figure 4A:
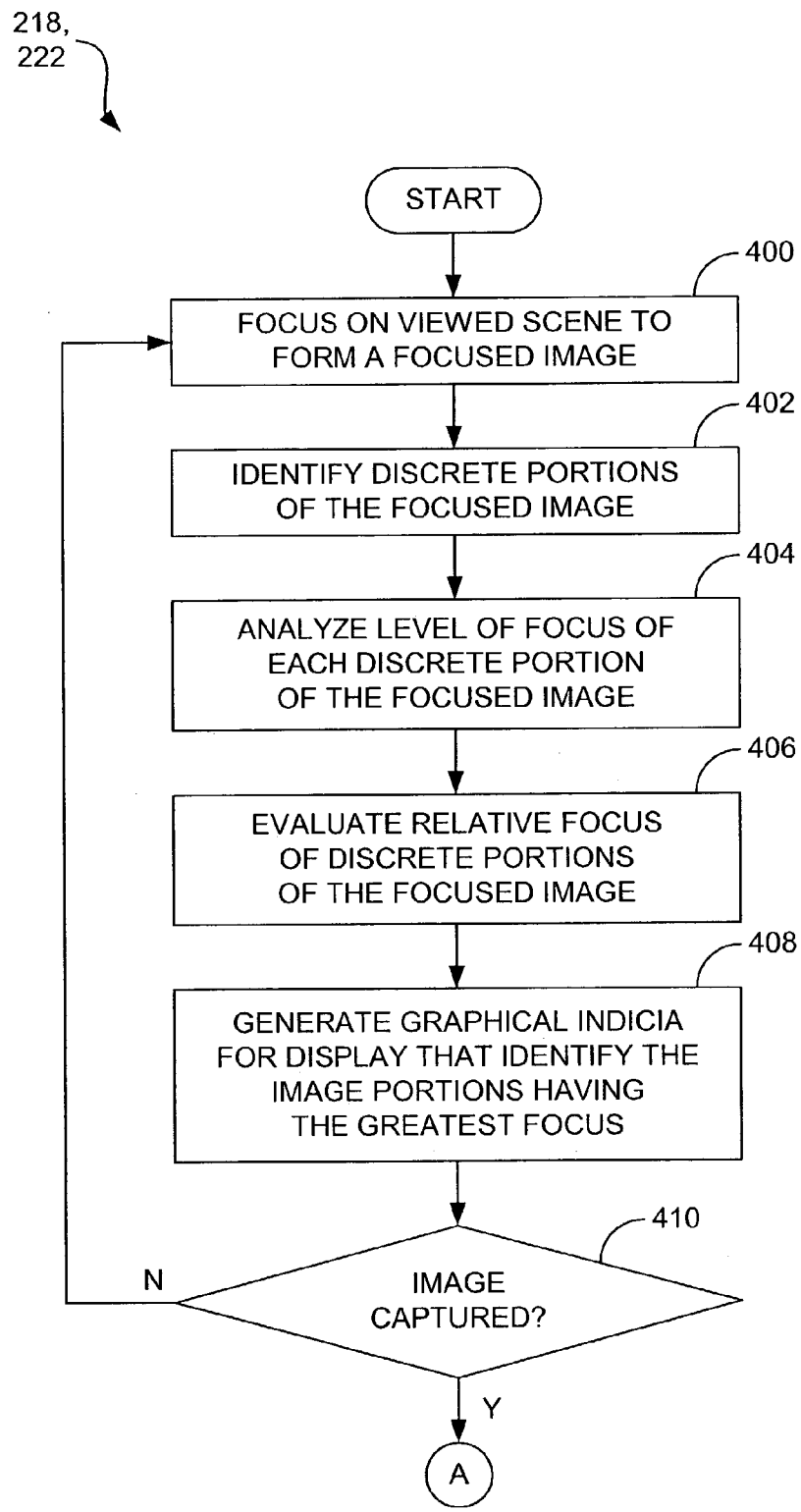
FIGS. 4A and 4B provide a flow diagram of a second embodiment of a method for providing focus feedback.
Figure 4B:
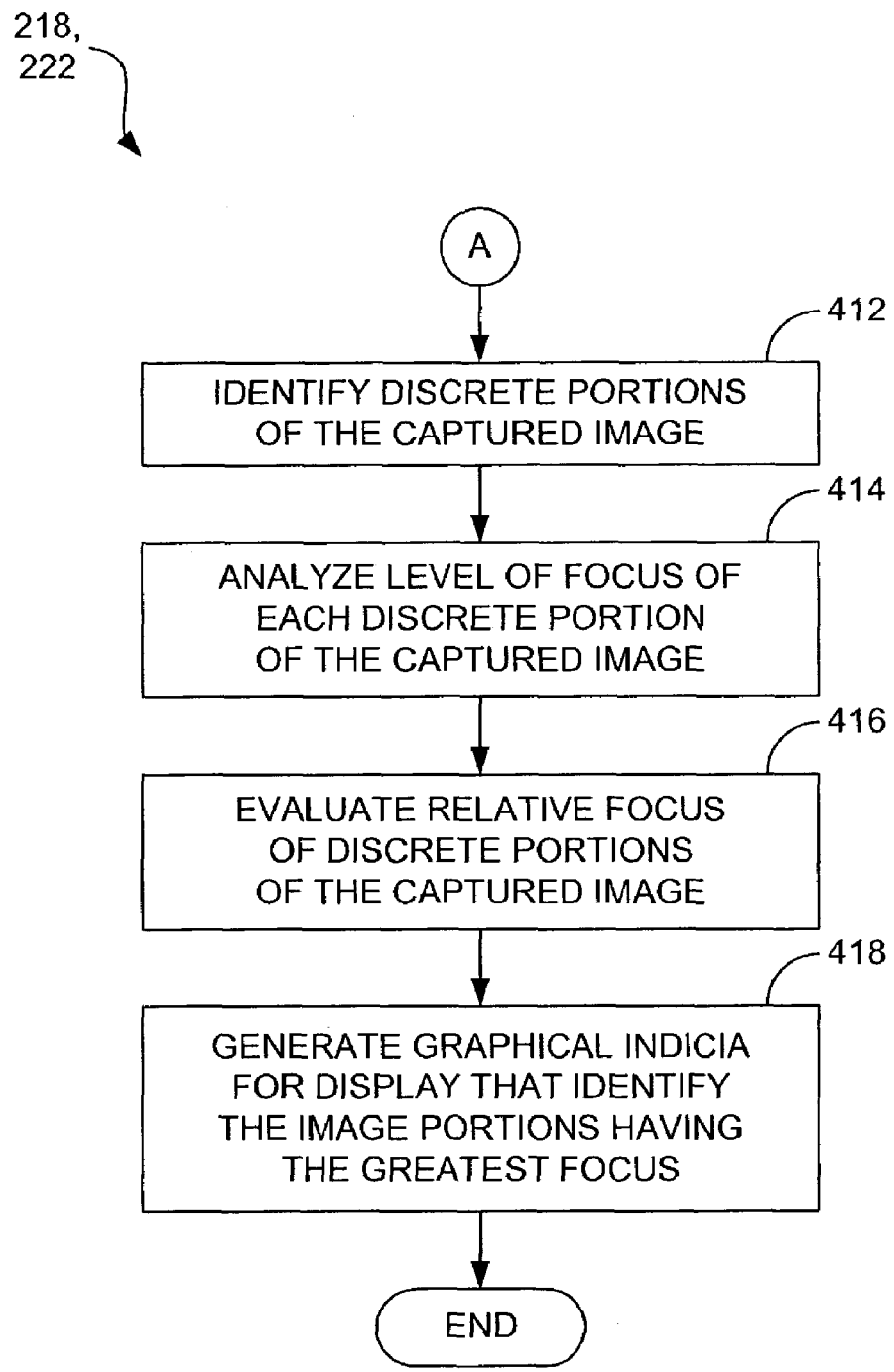

FIGS. 4A and 4B illustrate a second embodiment of a method for providing focus feedback to a camera user. In this embodiment, the autofocus system 216 and the focus feedback system 222 of the camera 100 work in conjunction with each other to indicate to the user which portions of an image are in focus and, therefore, which portions may be out of focus. Beginning with block 400 of FIG. 4A, a viewed scene is focused by the autofocus system 218. By way of example, this focusing occurs in response to the user having halfway depressed the shutter button of the camera after having composed a shot of which the user would like to capture an image while the camera is in an autofocus mode. Accordingly, the autofocus system 216 analyzes the viewed scene using a focusing algorithm 220 and assigns focus values to discrete portions of the viewed scene to determine the degree of focus of the discrete portions. By way of example, the focusing algorithm analyzes rectangular sections of the viewed scene and focus values are assigned to each section.

Once that analysis has been conducted and the various focus values have been assigned, the lens system 200 is manipulated to adjust the camera's focus. This procedure is repeated to generate new values for the various identified scene sections and the new values for these sections are then compared to the previous values to determine whether the focus improved or got worse. This process continues until what is determined to be an optimum focus has been achieved.

Figure 5A:
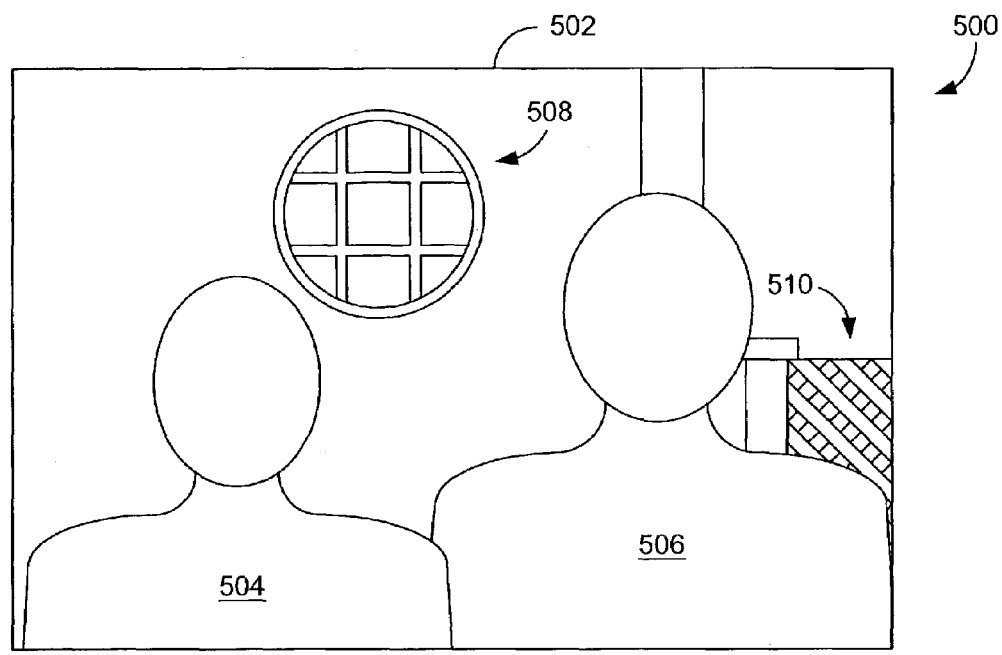
FIG. 5A is a schematic view of a camera display that is displaying a viewed or captured image.

At this point, a focused image has been generated and, if desired, that image can be captured to store it in camera memory (e.g., storage memory 224). It is noted that, although the image is "focused," the intended subject of the image may not be in proper focus. An example focused image is depicted in FIG. 5A. In particular, illustrated is a focused image 502 that is presented in a display 500, for instance back panel display 112 (FIG. 1). As shown in FIG. 5A, the scene in this image 502 example comprises two persons 504 and 506 that together comprise the intended subject of the shot and, therefore, are desired to be in focus. As is further indicated in FIG. 5A, background information, including a window 508 and a lattice-work fence 510, are also visible in the focused image.

Figure 5B:
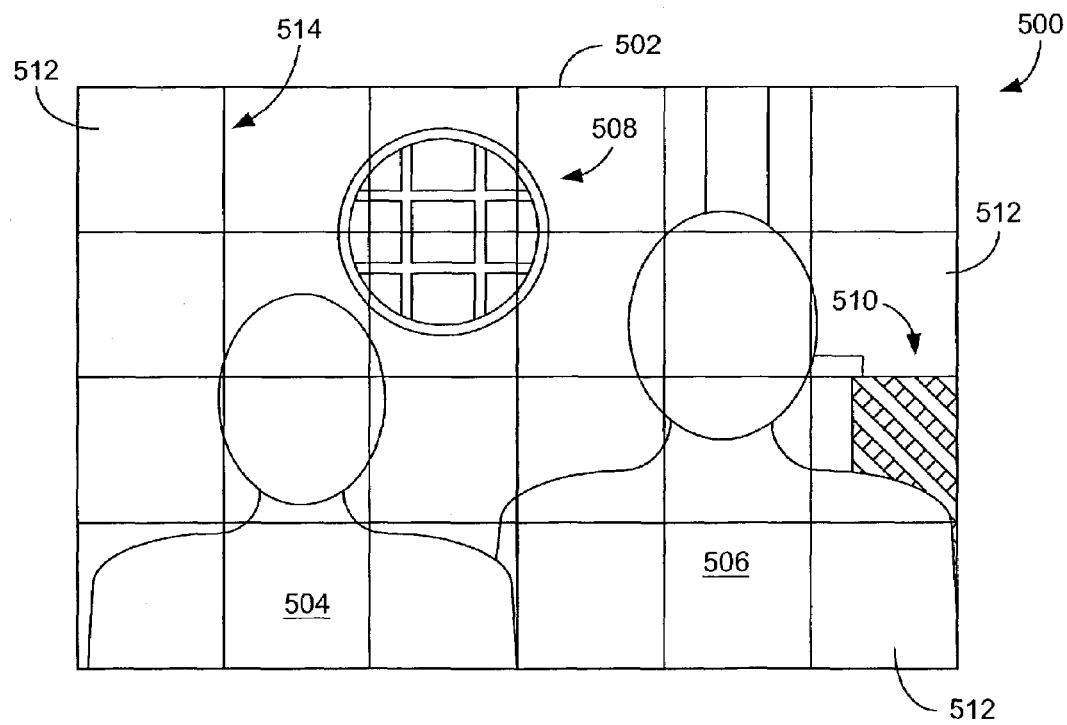
FIG. 5B is a schematic view of the image of FIG. 5A overlaid with an array or grid in which discrete portions of the image are identified.

With reference back to FIG. 4A, discrete portions of the focused image are next identified by the focus feedback system 222, as indicated in block 402. These portions can be the same portions that were identified during the focusing process described above. Alternatively, however, these portions may be portions other than those identified during the focusing process. FIG. 5B illustrates portions of the focused image from FIG. 5A that have been identified. As shown in FIG. 5B, the portions may comprise rectangles 512 of an array or grid 514 into which the focused image 502 has been divided.

Again returning to FIG. 4A, the focus feedback system 222 analyzes the level of focus of each discrete portion (e.g., rectangle 512, FIG. 5B) of the focused image, as indicated in block 404. By way of example, the analysis may be conducted by a focusing algorithm 220 of the autofocus system 218. In such a case, the focus feedback system 222 leverages this resource of the autofocus system 218 to conduct the focus analysis. In another example, the focus feedback system 222 uses its own focusing algorithm. In any case, the discrete portions are analyzed to determine how much each is in focus. Notably, the more focused portions of the image will be those that the autofocus system 218 relied upon to focus the image. This analysis may, for instance, yield focus values on a given scale (e.g., 1 to 10) that is indicative of the level of focus that has been achieved.

Next, with reference to block 406, the focus feedback system 222 evaluates the relative focus of the discrete image portions of the focused image. In situations in which the various portions have been assigned numerical values through the analysis conducted in block 404, this evaluation comprises comparing the determined values to see which portions have the highest values and, therefore, the greatest level of focus.

Figure 5C:
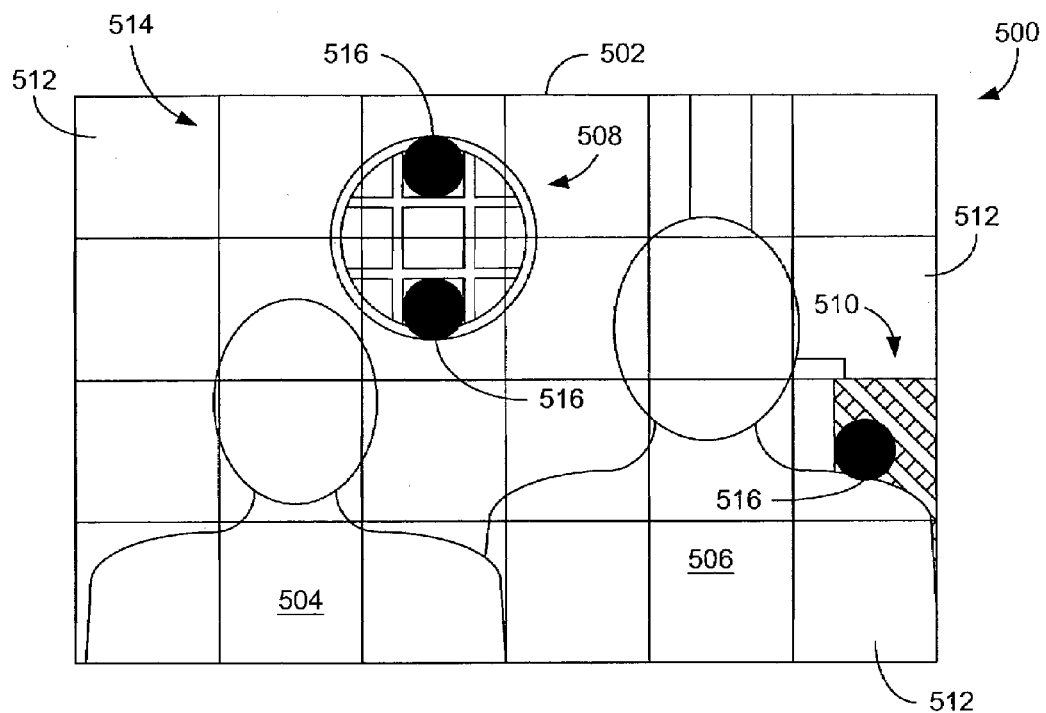
FIGS. 5C-5E are schematic views that illustrate focus feedback provided with respect to the image of FIG. 5A.
Figure 5D:
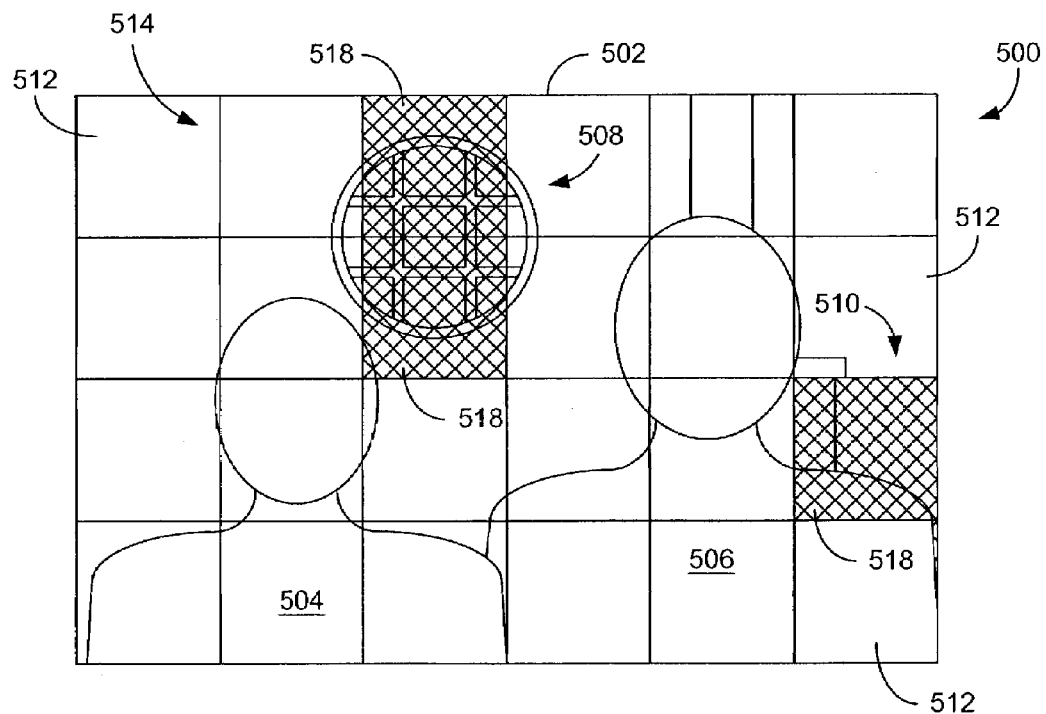
Figure 5E:
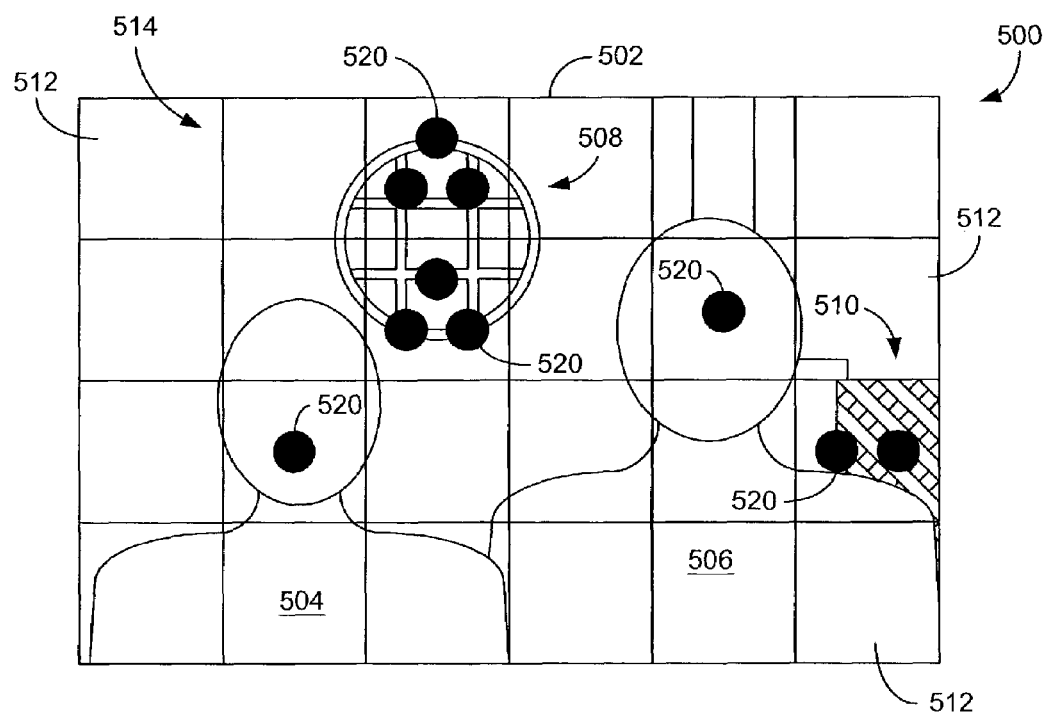

Once the relative focus of the discrete portions has been determined, the focus feedback system 222 generates graphical indicia for display to the user that identify the portions of the image having the greatest focus, as indicated in block 408. These indicia can take several different forms. Generally speaking, however, the indicia are highly intuitive such that the user may easily determine which portions of the focus image are most in focus. Various example indicia are illustrated in FIGS. 5C-5E. In these figures, the array or grid 514 is displayed so as to convey the bounds of each identified image portion. Alternatively, however, the grid can be hidden from the user. Beginning with FIG. 5C, the indicia comprise dots 516 that overly the discrete portions having the highest level of focus. In the example of FIG. 5C, the rectangles 512 that overlie the window 508 and the lattice-work fence 510 are provided with the dots 516 in that, due to their high contrast, the autofocus system 218 used these features to focus the image 502.

With reference next to FIG. 5D, the high focus portions of the focused image 502 are identified with shading 518 that fills the various rectangles 512 of the image having the greatest focus. Next, referring to FIG. 5E, focus graduations are indicated by providing varying indicia over the focused image 502. In particular, three dots 520 are provided in rectangles 512 having the greatest focus, two dots are provided in rectangles having a medium level of focus, and one dot is provided in rectangles having a relatively low level of focus.

From the examples of FIGS. 5C-5E, the user can easily appreciate that the intended subject of the focused image 502, i.e. persons 504 and 506, are not well focused relative to other aspects of the image. Therefore, the user will realize that the image should be recomposed and/or focus adjusted in some manner so that the persons 504 and 506 are brought into the desired degree of focus. Accordingly, before wasting a shot, the user is notified that the intended result will not be achieved unless some action is taken on the user's part.

Notably, although the indicia are described as a tool to ensure high focus of an intended subject, these indicia could be used to ensure other levels of focus, e.g., where the user wishes the subject in the foreground to be in "soft" focus relative to something in the background.

After being provided with the focus feedback described above, the user may wish to recompose the shot or adjust the focus of the camera. In the former case, the user may, for example, zoom in on the persons 504 and 506 that the user wishes to capture. In the latter case, the user may lock the focus on one of the persons 504 and 506 before capturing an image. Alternatively, the user may reinitiate the autofocusing process by releasing the shutter button and depressing it again to a halfway point. In yet another alternative, the user may adjust the autofocus settings of the camera such that the reference points used to focus the image by the autofocus system 218 coincide with the positions of the persons 504 and 506. In another alternative, the user may switch the camera to a manual focus mode.

In any case, it is determined whether an image is to be captured, as indicated in decision block 410. This determination is made, for example, in regard to whether the shutter button is fully depressed or whether the user does something else (e.g., recomposes the shot, reinitiates the autofocusing process). If an image is not to be captured, flow returns to block 400 and the focusing process and analysis/evaluation process described above begins again. If, on the other hand, an image is captured, the captured image is displayed in the camera display (e.g., display 112, FIG. 1) and the analysis/evaluation process is practiced again, this time on the captured image. Accordingly, with reference to block 412 of FIG. 4B, discrete portions of the captured image are identified by the focus feedback system 222. Again, these portions may comprise the rectangles of an array or grid such as that illustrated in FIG. 5B.

Next, with reference to block 414, the focus feedback system 222 analyzes the level of focus of each discrete portion of the captured image and, as indicated in block 416, evaluates the relative focus of the discrete portions of the captured image. Once the relative focus of the discrete portions has been determined, the focus feedback system 222 generates graphical indicia for display that identify the portions of the image having the greatest focus, as indicated in block 418. Again, these indicia can take several different forms and examples include those illustrated in FIGS. 5C-5E.

In view of the above, the user can determine, from the indicia provided by the focus feedback system 222, that the intended subject of the captured image, i.e. persons 504 and 506, are not well focused relative to other aspects of the image. Therefore, the user will realize that the image should be recomposed and/or focus adjusted in some manner, and the image recaptured. With such notification, the user will immediately know whether he or she got the shot the user wanted and, therefore, will have the opportunity to try again if not.

While particular embodiments of the invention have been disclosed in detail in the foregoing description and drawings for purposes of example, it will be understood by those skilled in the art that variations and modifications thereof can be made without departing from the scope of the invention as set forth in the claims.

Various programs (software and/or firmware) have been identified above. These programs can be stored on any computer-readable medium for use by or in connection with any computer-related system or method. In the context of this document, a computer-readable medium is an electronic, magnetic, optical, or other physical device or means that can contain or store programs for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" encompasses any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

What is claimed is:

1. A method for providing feedback to a camera user, comprising:
   capturing an image in response to a user fully depressing a shutter button of a camera;
   storing the captured image in memory;
   dividing the captured image into discrete portions such that substantially each area of the image pertains to one discrete portion;
   analyzing levels of focus of the discrete portions of the captured image;
   evaluating a relative focus of the discrete portions by comparing the levels of focus of each discrete portion; and
   identifying to a user the discrete portions having relatively high levels of focus with a graphical indication presented in a display of the camera without providing any graphical indication for the discrete portions having relatively low levels of focus such that the user can see what areas of the captured image are more in focus, wherein
   displaying the graphical indication comprises at least one dot displayed over a discrete portion in the display.

2. The method of claim 1, wherein analyzing levels of focus comprises analyzing the discrete portions using a focusing algorithm.

3. The method of claim 1, wherein analyzing levels of focus comprises assigning numerical values to the discrete portions, each numerical value being indicative of the level of focus of a discrete portion.

4. The method of claim 3, wherein evaluating a relative focus comprises comparing the assigned numerical values.

5. A method for providing a camera user with feedback as to which portions of an image are most focused, comprising:
   focusing on a viewed scene to form a focused image;
   identifying discrete portions of the focused image such that substantially each area of the image pertains to one discrete portion;
   analyzing a level of focus as to each discrete portion;
   evaluating a relative focus of the discrete portions to determine which are relatively more in focus by comparing the levels of focus of each discrete portion; and
   presenting a graphical indication in a camera display that identifies each discrete portion by displaying a grid that identifies the bounds of the discrete portions, the graphical indication further identifying the discrete portions which are relatively more in focus without providing any graphical indication for the discrete portions having relatively low levels of focus.

6. The method of claim 5, wherein analyzing a level of focus comprises assigning numerical values to the image portions.

7. The method of claim 6, wherein evaluating a relative focus comprises comparing the assigned numerical values.

8. The method of claim 5, further comprising:
   capturing an image in response to a user fully depressing a shutter button;
   storing the captured image in memory;
   analyzing a level of focus as to each discrete portion of the captured Image;
   evaluating a relative focus of the discrete portions of the captured image to determine which are relatively more in focus; and
   presenting a graphical indication in the display that identifies each discrete portion of the captured image, the graphical indication further identifying the discrete portions of the captured image which are relatively more in focus without providing any graphical indication for the discrete portions of the captured image having relatively low levels of focus such that the user can see what areas of the captured image are more in focus.

9. A camera, comprising:
   a display that is configured to display images;
   a processor that controls operation of the display; and
   a memory comprising a focus feedback system that is configured to:
   focus on a viewed scene to form a focused image,
   identify discrete portions of the focused image such that substantially each area of the image pertains to one discrete portion,
   analyze a level of focus as to each discrete portion,
   evaluate a relative focus of the discrete portions to determine which are relatively more in focus by comparing the levels of focus of each discrete portion, and
   present a graphical indication in the display that identifies each discrete portion with a grid that identifies the bounds of the discrete portions, the graphical indication further identifying the discrete portions which are relatively more in focus without providing any graphical indication for the discrete portions having relatively low levels of focus.

10. The camera of claim 9, wherein the focus feedback system is configured to assign numerical values to the image portions that are indicative of the level of focus of the image portions.

11. The camera of claim 9, wherein the graphical indication of the relatively more in focus discrete portions comprises dots that overlie the discrete portions that are relatively more in focus.

12. The camera of claim 9, wherein the graphical indication of the relatively more in focus discrete portions comprises shading that overlies entire discrete portions in the display.

13. The camera of claim 9, wherein the focus feedback system is further configured to:
capture an image in response to a user fully depressing a shutter button:
store the captured image in memory;
analyze a level of focus as each discrete portion of the captured image;
evaluate a relative focus of the discrete portions of the captured image to determine which are relatively more in focus; and
present a graphical indication in the display that identifies each discrete portion of the captured image, the graphical indication further identifying the discrete portions of the captured which are relatively more in focus without providing any graphical indication for the discrete portions of the captured image having relatively low levels of focus such that the user can see what areas of the captured image are more in focus.

14. A method for providing feedback to a camera user, comprising:
capturing an image in response to a user fully depressing a shutter button of a camera;
storing the captured image in memory; dividing the captured image into discrete portions such that substantially each area of the image pertains to one discrete portion; analyzing levels of focus of the discrete portions of the captured image;
evaluating a relative focus of the discrete portions by comparing the levels of focus of each discrete portion; and
identifying to a user the discrete portions having relatively high levels of focus with a graphical indication presented in a display of the camera without providing any graphical indication for the discrete portions having relatively low levels of focus such that the user can see what areas of the captured image are more in focus, wherein
the graphical indication comprises shading displayed over entire discrete portions in the display.

15. The method of claim 14, wherein analyzing levels of focus comprises analyzing the discrete portions using a focusing algorithm.

16. The method of claim 14, wherein analyzing levels of focus comprises assigning numerical values to the discrete portions, each numerical value being indicative of the level of focus of a discrete portion.

17. The method of claim 16, wherein evaluating a relative focus comprises comparing the assigned numerical values.

* * * * *

UNITED STATES PATENT AND TRADEMARK OFFICE
CERTIFICATE OF CORRECTION

PATENT NO. : 7,248,301 B2
APPLICATION NO. : 10/428243
DATED : July 24, 2007
INVENTOR(S) : James S. Voss et al.

It is certified that error appears in the above-identified patent and that said Letters Patent is hereby corrected as shown below:

In column 8, line 26, in Claim 8, delete "Image;" and insert -- image; --, therefor.

In column 9, line 8, in Claim 13, delete "button:" and insert -- button; --, therefor.

Signed and Sealed this

Fifth Day of May, 2009

JOHN DOLL
*Acting Director of the United States Patent and Trademark Office*